(12) United States Patent
Moser et al.

(10) Patent No.: US 11,860,377 B2
(45) Date of Patent: Jan. 2, 2024

(54) DEVICE FOR EMITTING LIGHT

(71) Applicant: FISBA AG, St. Gallen (CH)

(72) Inventors: Hansruedi Moser, Hinterforst (CH); Pascal Wüst, Oberriet (CH); Martin Forrer, Appenzell (CH)

(73) Assignee: FISBA AG, St. Gallen (CH)

( * ) Notice: Subject to any disclaimer, the term of this patent is extended or adjusted under 35 U.S.C. 154(b) by 261 days.

(21) Appl. No.: 17/427,154

(22) PCT Filed: Nov. 20, 2019

(86) PCT No.: PCT/EP2019/081902
§ 371 (c)(1),
(2) Date: Jul. 30, 2021

(87) PCT Pub. No.: WO2020/160806
PCT Pub. Date: Aug. 13, 2020

(65) Prior Publication Data
US 2022/0099989 A1    Mar. 31, 2022

(30) Foreign Application Priority Data
Feb. 5, 2019 (EP) .................................... 19155464

(51) Int. Cl.
G02B 27/30 (2006.01)
G02B 3/06 (2006.01)
G02B 19/00 (2006.01)

(52) U.S. Cl.
CPC ............... *G02B 27/30* (2013.01); *G02B 3/06* (2013.01); *G02B 19/0052* (2013.01)

(58) Field of Classification Search
CPC ...... G02B 27/30; G02B 3/06; G02B 19/0052; G02B 19/0014; G02B 3/02
See application file for complete search history.

(56) References Cited

U.S. PATENT DOCUMENTS

| 6,154,282 A | 11/2000 | Lilge et al. |
| 6,904,197 B2 | 6/2005 | Bhagavatula et al. |
| 8,102,581 B2 | 1/2012 | Voss et al. |
| 2011/0103056 A1* | 5/2011 | Wolak ................ G02B 27/0905 359/641 |

(Continued)

FOREIGN PATENT DOCUMENTS

| DE | 60304841 | 11/2006 |
| GB | 2510401 | 8/2014 |

OTHER PUBLICATIONS

European Search Report Corresponding to 19155464.1 dated Jul. 31, 2019.

(Continued)

*Primary Examiner* — Robert E. Tallman
(74) *Attorney, Agent, or Firm* — Finch & Maloney PLLC

(57) ABSTRACT

A device (1) for emitting light to a beam-collimating lens (3), and a method for producing a beam-collimating lens (3). The device (1) comprises at least one laser light source (2) and a beam-collimating lens (3), in particular for fast axis collimation. The beam-collimating lens (3) comprises at least one biconvex collimation element (4) and is produced from silica glass, preferably by a fiber drawing process. The laser light source (2) emits visible laser light, typically having in a wavelength in the range of 400-550 nm.

15 Claims, 3 Drawing Sheets

(56) References Cited

U.S. PATENT DOCUMENTS

2011/0249342 A1  10/2011  Scaggs

OTHER PUBLICATIONS

Figure 1:
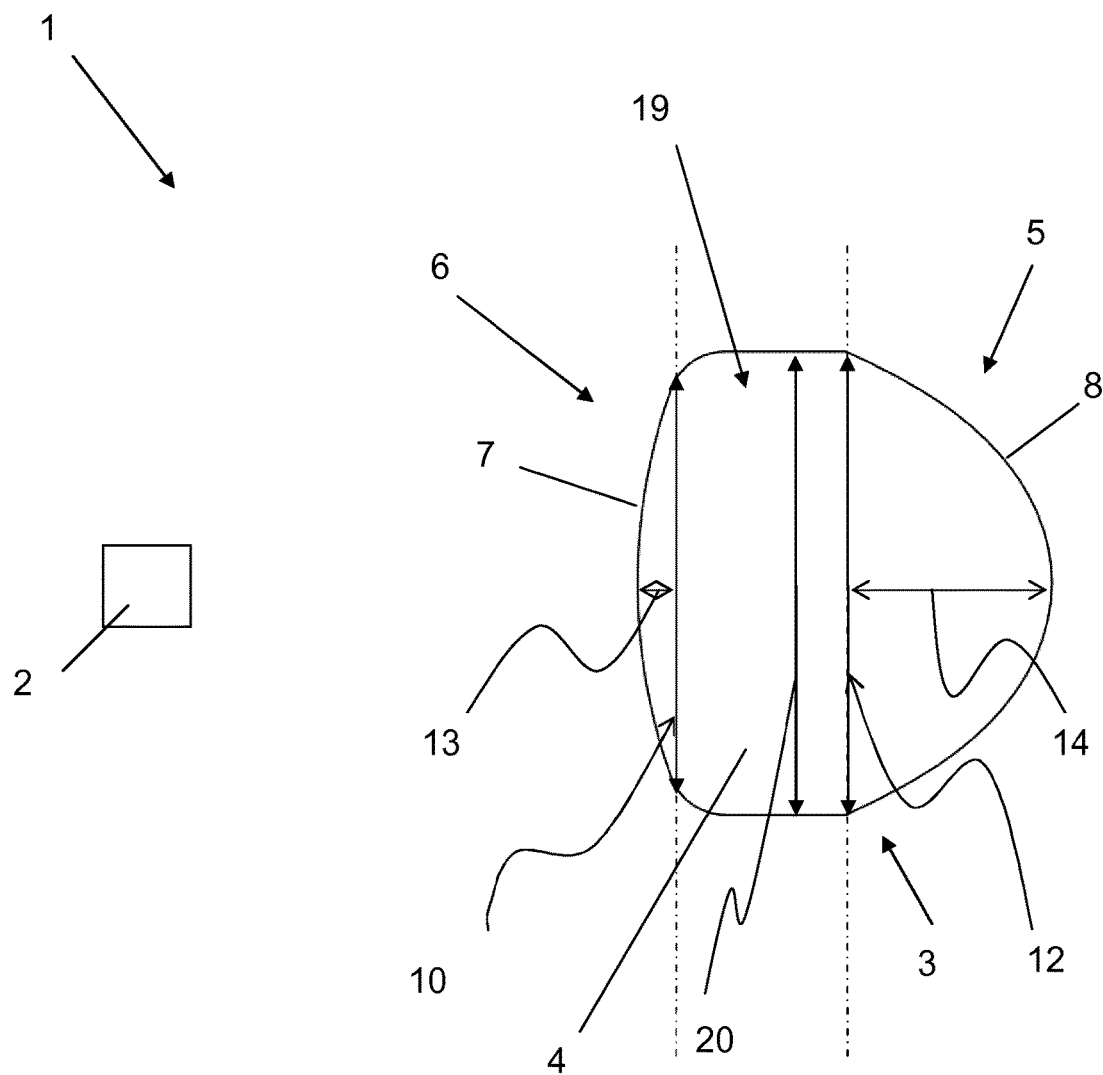

European Search Report Corresponding to 19155464.1 dated Oct. 9, 2019.
International Search Report Corresponding to PCT/EP2019/081902 dated May 4, 2020.
Written Opinion Corresponding to PCT/EP2019/081902 dated May 4, 2020.

* cited by examiner

DEVICE FOR EMITTING LIGHT

The invention relates to a device for emitting light, beam collimating lens and a method of manufacturing a beam collimating lens.

Devices for emitting light can be used as high power diode lasers. Typically, such devices are used for light emitters with an asymmetric beam field, which has a so-called "fast axis" and a so-called "slow axis".

The fast axis refers to a vertical axis (perpendicular to the semiconductor wafer) that is perpendicular to the slow axis (parallel to the front of the semiconductor wafer). The slow axis and the fast axis are perpendicular to each other and orthogonal to the beam propagation direction (z-axis). Along the propagation direction, a single emitter with, for example, a dimension of the order of 1 micron has a numerical aperture of 0.5-0.7 in the fast axis and a numerical aperture of 0.05-0.2 in the slow axis.

The most common collimators for fast axes are plano-cylindrical lenses. These are used to provide low aberration collimation for fast-axis with high numerical aperture.

Such collimators are typically made of high quality glass. A high-refractive-index material minimizes the maximum sag of the lens and the degree of surface tilt required to achieve the required refraction. For non-critical performance requirements, homogeneous cylindrical rod lenses, i.e. fibers, can also be used.

GB2510401 A discloses a micro-optical element for use with a laser diode stack, the element comprising a plurality of biconvex fast axis collimator elements formed as a monolithic array. In this regard, the arrangement of inlet lenses is provided on a first surface of the element and an arrangement of outlet lenses is provided on a second surface, opposite the first surface, of the element. The arrangement of the inlet and outlet lenses may be adapted to the arrangement of a plurality of individual emitters arranged in a row or in a two-dimensional array. The monolithic element can be fabricated from fused silica using laser micromachining.

Collimating elements with glasses having high transmittance values are mainly used for diode lasers in a wavelength range between 800 and 1000 nm.

In a wavelength range smaller than 550 nm, especially in the range of 400-500 nm, light emitters with high powers are also available. The choice of glass materials with high transmission values is limited for this wavelength range.

Furthermore, the processing methods are complex and thus very expensive.

It is the task of the invention to eliminate the disadvantages of the state of the art and in particular to provide a device for emitting light, a beam collimating lens as well as a method for manufacturing a beam collimating lens, with which a good optical collimation quality can be provided at low cost.

The task is solved by a device for emitting light, comprising at least one laser light source and at least or exactly one beam collimation lens, in particular for fast-axis collimation.

The beam collimating lens comprises at least one biconvex collimating element and is made of quartz glass.

The laser light source emits visible laser light, in particular with wavelengths of less than or equal to 550 nm, in particular in a wavelength range from 300 nm to 550 nm, further in particular from 400-500 nm.

At smaller wavelengths, the industrially available powers increase sharply and so do the requirements for minimum absorption in the beam collimating lens. High powers can lead to severe heating and there is a risk of defocusing and thus degradation of beam quality.

Conventional fast-axis collimating elements with a refractive index n of about 1.80 already show a strong temperature increase at low powers.

Collimating elements made of fused silica with a refractive index of about 1.45 show a small temperature increase up to powers of more than 200 W. The beam quality can therefore be guaranteed over a large power range.

In a preferred embodiment, the device has a plurality of laser light sources. The laser light sources can be arranged in a two-dimensional array. Preferably, laser light sources are arranged in a row adjacent to each other.

Preferably, the beam collimating lens has an array of biconvex collimating elements corresponding to the arrangement of the laser light sources. Advantageously, the beam collimating lens is monolithic.

The disadvantage of the smaller refractive index of fused silica can be compensated by a corresponding shape of the entrance and exit surfaces. The biconvex collimating element can have an acylindrical shape on the exit side and a cylindrical shape or an acylindrical shape on the entrance side.

By "cylindrical" shape it is meant that the cross-section of the collimating element has a circular shape, whereas in an acylindrical shape there is a deviation from the circular segment, for example the shape of a polynomial.

Preferably, the entire inlet surface of the biconvex collimating element is convexly curved and/or the entire outlet surface of the biconvex collimating element is also convexly curved. Thus, the surface of the collimating element has a simple shape with no concave or planar partial surfaces. This facilitates the manufacturing process.

Particularly preferably, the entrance surface of the entire beam collimating lens is convexly curved and/or the exit surface of the entire beam collimating lens is also convexly curved, in particular also when the device for emitting light comprises a plurality of emitters and a beam collimating lens is used for these plurality of emitters.

In a particularly advantageous embodiment of the device, the beam collimating lens is rod-shaped. Rod-shaped means that the lens is cylindrical and is preferably longer in a direction transverse to the light propagation, namely in the fast-axis direction, than in the direction of light propagation.

The beam collimation lens can be designed as a biconvex cylinder in such a way that it can be used for a plurality of laser light sources arranged in a row.

The biconvex cylinder may be provided with a cross-section having a circular segment on the entrance side.

Such a beam collimating lens has a simple geometry and can therefore be manufactured inexpensively, for example in a fiber drawing process.

Rod-shaped beam collimating lenses can also be easily combined to form a beam collimating lens array for laser light sources arranged in a two-dimensional array, for example by gluing beam collimating lenses to each other on the long sides.

The task is solved by a beam collimation lens, in particular for fast-axis collimation, for a device for emitting light as described above.

The beam collimating lens comprises at least one biconvex collimating element and is made of quartz glass. The entrance surface of the biconvex collimating element is convexly curved and the exit surface of the biconvex collimating element is also convexly curved, so that sufficient refraction can be achieved despite the low refractive index of the quartz glass.

In an advantageous embodiment, the biconvex collimating element has an entrance surface with an area of 0.2 mm$^2$-10 mm$^2$, and/or with a length of 2 mm-12 mm and/or with a height of 0.1 mm-0.85 mm.

By entrance surface it is meant the surface of the biconvex collimating element facing the light source.

In an advantageous embodiment, the biconvex collimating element has an exit surface with an area of 0.6 mm$^2$-30 mm$^2$ and/or with a length of 2 mm-12 mm and/or a height of 0.3 mm-2.5 mm.

By exit surface it is meant the surface of the biconvex collimating element facing away from the light source.

The biconvex collimating element may have a maximum depth of curvature of 0.1 mm on the entrance side and/or on the exit side a maximum depth of curvature of 0.5 mm.

The biconvex collimating element can have a focal length of 0.2 mm to 1.8 mm.

The data of the heights concern the optically effective areas. Since the entrance is close to the emitter and there is a large divergence, the optically effective height at the entrance side is smaller than at the exit side. However, the collimating element can be manufactured so that the entrance and exit sides have approximately equal heights.

In each case, the above dimensions may also apply to the entire beam collimating lens.

In a preferred embodiment, the beam collimating lens is manufactured by a fiber drawing process. The beam collimating lens then preferably has the overall shape of a biconvex cylinder.

The circumferential surfaces of the beam collimating lens, i.e., the surfaces on the cylinder shell, are glossy and precise in shape. The beam collimating lens has no dull partial surfaces on the circumference, including the non-optical upward and downward circumferential surfaces. Neither saw marks nor traces of a pressing tool are visible on the circumferential surface.

The non-optical side surfaces transverse to the cylinder axis may be dull due to a separation step, and may have saw marks, for example.

In a preferred embodiment, the beam collimating lens is rod-shaped.

The problem is further solved by a method for producing a beam collimating lens as described above with the following steps.

First, a biconvex preform made of quartz glass is provided. Its cross-sectional area is larger, in particular by a factor of 100 to 10000, than the cross-sectional area of the collimating element of the beam collimating lens to be manufactured.

The preform is manufactured using conventional manufacturing processes for glass, such as grinding and polishing. The required shape accuracy of the lens can be realized by scaling through conventional manufacturing of a large preform with reasonable effort.

The preform is heated, in particular to temperatures of 2000-2200° C. The preform is introduced into a corresponding furnace. For this purpose, the preform, which has a shape congruent with the collimating element to be produced, is introduced into a corresponding furnace.

After heating, the beam collimating lens is drawn off, whereby scaling takes place, i.e. the cross-sectional area is reduced.

This is typically done with a pull-off device that includes rollers. The pull-off force is adjusted to the desired scaling.

During pull-off, after exiting the furnace, the beam collimating lens may still be at a temperature of a few hundred degrees, which is well below the glass transition temperature, and have its final cross-section.

Cooling can take place in air.

Rod-shaped lenses can then be cut to a desired length.

Due to the large scaling from the preform to the final part, the individual components can be produced cost-effectively in high volumes.

If desired, rod-shaped beam collimating lenses can then be glued together to form a two-dimensional collimating field.

The task is further solved by the use of a device for emitting light as described above for processing non-ferrous metals.

Short wavelengths are suitable for the processing of non-ferrous metals in order to enable efficient processing.

High power diode lasers with shorter wavelengths can be provided in a simple and cost effective manner using a beam collimating lens as described above.

Figure 2:
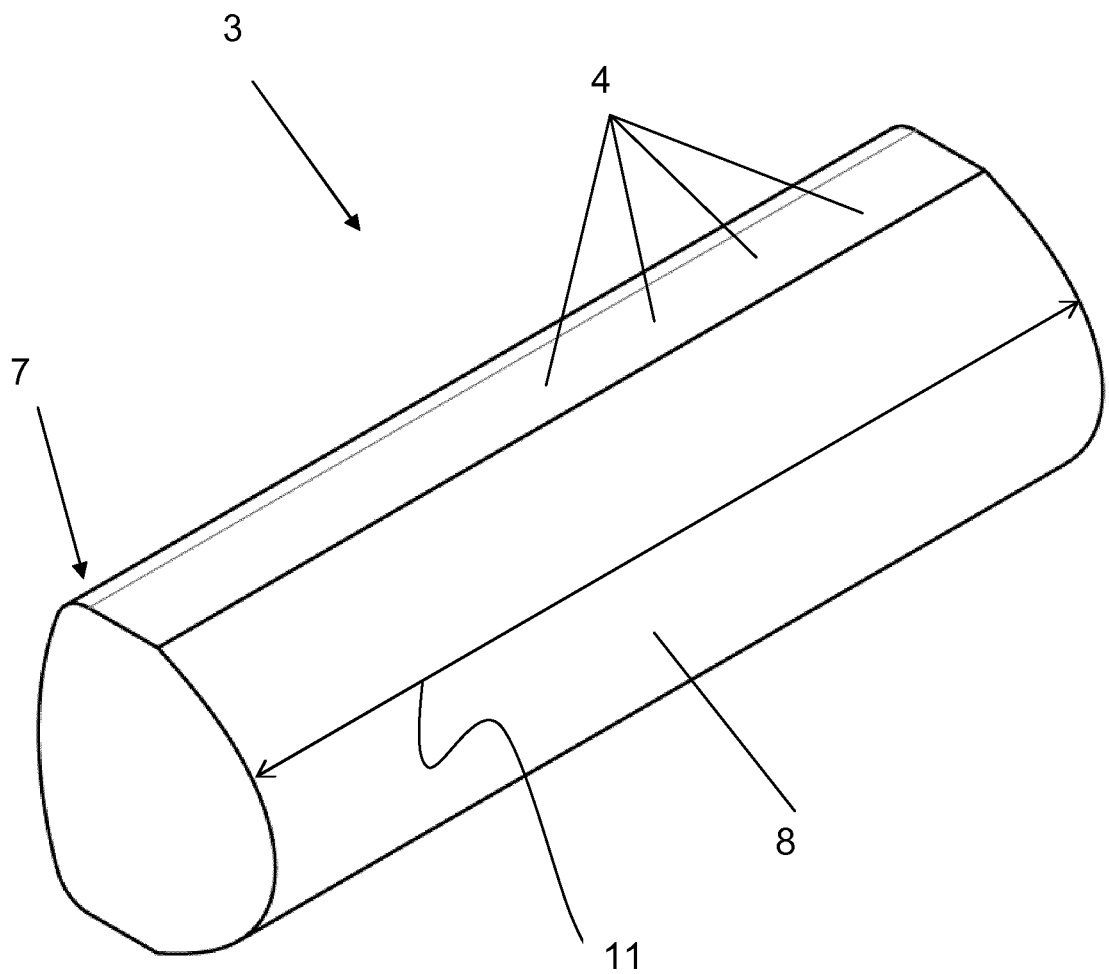
Figure 3:
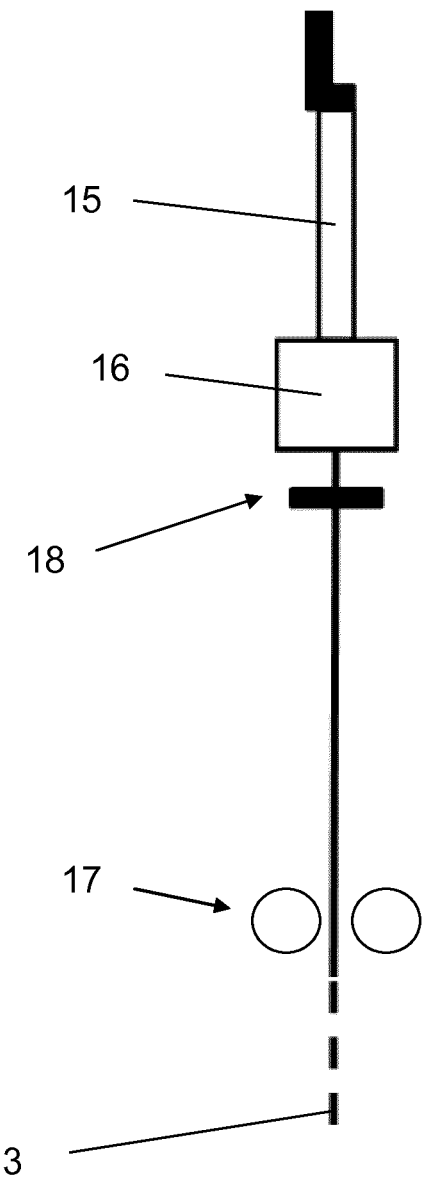

The invention is explained with reference to the following figures. It shows:

FIG. 1: a device according to the invention in cross-section;

FIG. 2: a perspective view of a beam collimating lens according to the invention;

FIG. 3: a schematic representation of the manufacture of a beam collimating lens.

FIG. 1 shows a device 1 for emitting light in cross-section. The device 1 comprises several laser light sources 2 arranged in a row, as well as a beam collimation lens 3 for fast-axis collimation.

The beam collimating lens 3 comprises biconvex collimating elements 4 and is made of quartz glass.

The laser light sources 1 emit visible laser light with wavelengths of less than 550 nm, in particular in a wavelength range of 300-500 nm.

The biconvex collimating element 4 has a maximum depth of curvature 13 of 0.1 mm on the entrance side 6.

The biconvex collimating element 4 has a maximum depth of curvature 14 of 0.5 mm on the exit side 5.

The entrance surface 7 has a height 10 of 0.1 mm-0.85 mm, the exit surface 8 has a height 12 of 0.3 mm-2.5 mm.

The beam collimating lens 3 is preferably manufactured such that a large part of the area 19 between the entrance and exit sides has a constant height 20.

The contour of the exit side 5 may follow the following polynomial.

$$z(h) = \frac{\frac{h^2}{R}}{1 + \sqrt{1 - (1+k)\frac{h^2}{R^2}}} + \sum_{k=1}^{N} A_a \cdot h^n$$

Preferably, the shape follows a tenth order polynomial. The coefficients are for example R=−0.3 mm;
k=−1;
$A_4$=−3.2812 mm$^{-3}$,
$A_6$=16.414 mm$^{-5}$,
$A_8$=−241.567 mm$^{-7}$ and
$A_{10}$=822.595 mm$^{-9}$.

FIG. 2 shows a beam collimation lens 3 according to the invention in perspective view. The beam collimating lens 3 is rod-shaped, so that the adjacent biconvex collimating elements 4 merge into each other and form a common entrance surface 7 and exit surface 8.

The entrance surface 7 and the exit surface 8 have a length 11 of 2 mm-12 mm.

FIG. 3 shows a schematic diagram of the manufacture of a beam collimating lens 3.

First, a biconvex preform 15 made of quartz glass is provided.

In a furnace 16, the preform 15 is heated to temperatures of 2000-2200° C.

After heating, the beam collimating lens 3 is pulled off with a roller pull-off device 17, reducing the cross-sectional area.

The cross-section is checked by a measuring system 18 after exiting the furnace 16.

Cooling takes place in air.

Subsequently, rod-shaped beam collimating lenses 3 are cut off in a desired length.

The invention claimed is:

1. A device for emitting light comprising:
   at least one laser light source,
   at least one beam collimation lens for fast-axis collimation, and
   the at least one beam collimation lens comprising at least one biconvex collimation element and being made of quartz glass,
   wherein the laser light source emits visible laser light,
   wherein the biconvex collimating element has an acylindrical shape on the exit side and has a cylindrical shape on the entrance side, wherein the exit surface of the entire biconvex collimating element is convexly curved.

2. The device according to claim 1, wherein the device comprises a plurality of laser light sources.

3. The device according to claim 2, wherein the beam collimating lens comprises an array of biconvex collimating elements.

4. The device according to claim 1, wherein an entrance surface of the biconvex collimating element is convexly curved.

5. The device according to claim 1, wherein the beam collimating lens is rod-shaped.

6. A beam collimating lens for a device for emitting light, wherein the beam collimating element comprises at least one biconvex collimating element for fast-axis collimation and is made of quartz glass, and an entrance surface of the biconvex collimating element is convexly curved and an exit surface of the biconvex collimating element is convexly curved, wherein the biconvex collimating element has an acylindrical shape on the exit side and has a cylindrical shape on the entrance side, wherein the exit surface of the entire biconvex collimating element is convexly curved.

7. The beam collimating lens according to claim 6 wherein the beam collimating lens is for a device for emitting light comprising:
   at least one laser light source,
   at least one beam collimation lens, and
   the at least one beam collimation lens comprising at least one biconvex collimation element and being made of quartz glass,
   wherein the laser light source emits visible laser light.

8. The beam collimating lens according to claim 6, wherein the biconvex collimating element comprises at least one of
   an entrance surface with an area of 0.2 $mm^2$-10 $mm^2$, an entrance surface with a length of 2 mm-12 mm, and an entrance surface with a height of 0.1 mm -0.85 mm,
   an exit surface with an area of 0.6 $mm^2$-30 $mm^2$, an exit surface with a length of 2 mm-12 mm, and an exit surface with a height of 0.3 mm -2.5 mm,
   on the entrance side, a maximum depth of curvature of 0.1 mm,
   a maximum depth of curvature of 0.5 mm on the exit side, and
   a focal length of 0.2 mm to 2 mm.

9. The beam collimating lens according to claim 6, wherein the beam collimating lens is manufactured in a fiber drawing process.

10. The beam collimating lens according to claim 6, wherein the beam collimating lens is rod-shaped.

11. A method for producing a beam collimating lens with at least one biconvex collimating element according to claim 6, comprising the following steps
    providing a biconvex preform of quartz glass which has a cross-sectional area that is larger than a cross-sectional area of the collimating element of the beam collimating lens to be produced;
    heating the preform;
    pulling off the beam collimating lens; and
    cooling.

12. The method according to claim 11, wherein the cross-sectional area of the biconvex preform is larger by a factor of 100 to 10,000 than the cross-sectional area of the collimating element of the beam collimating lens to be produced.

13. The method according to claim 11, wherein the preform is heated to temperatures of between 2,000-2,200° C.

14. The method according to claim 11, wherein a desired length is cut off the beam collimating lens.

15. A method of using a device for emitting light according to claim 1, wherein non-ferrous metals are processed.

* * * * *